(No Model.)

H. EVANS.
NUT LOCK.

No. 589,424. Patented Sept. 7, 1897.

Witnesses
Chas. P. Hunemann
Victor J. Evans

Inventor
Howell Evans
By John Wedderburn
Attorney

UNITED STATES PATENT OFFICE.

HOWELL EVANS, OF BLOCTON, ALABAMA.

NUT-LOCK.

SPECIFICATION forming part of Letters Patent No. 589,424, dated September 7, 1897.

Application filed May 19, 1897. Serial No. 637,153. (No model.)

*To all whom it may concern:*

Be it known that I, HOWELL EVANS, of Blocton, in the county of Bibb and State of Alabama, have invented certain new and useful Improvements in Bolts; and I do hereby declare the following to be a full, clear, and exact description of the invention, such as will enable others skilled in the art to which it appertains to make and use the same.

The invention relates to a bolt especially designed for securing fish-plates to the adjoining ends of two railroad-rails for securing the opposing plates of the fish-plates to each other and to the interposed ends of the rail.

It consists of a bolt having its main or body portion screw-threaded in one direction and provided with a reduced end extension reversely screw-threaded and in the combination therewith of a nut on the body portion of the bolt and a spring interposed between said nut and the bolt-head, as hereinafter described and claimed.

Figure 1:
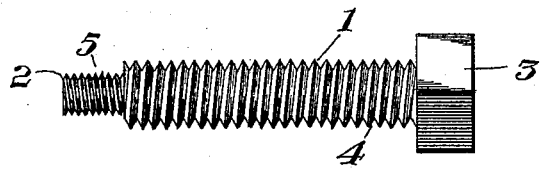
Figure 2:
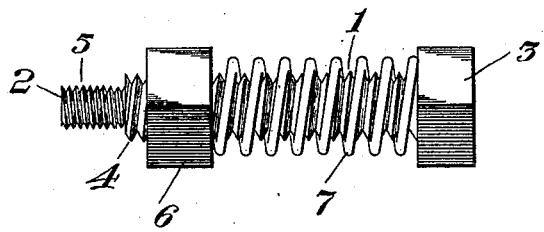
Figure 3:
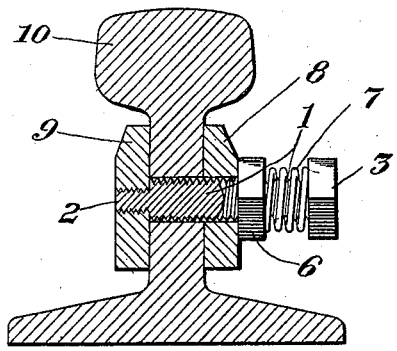

In the accompanying drawings, Figure 1 represents the bolt in side elevation. Fig. 2 is a similar view showing the nut and spring applied; and Fig. 3 represents a transverse section through a railroad-rail and the fish-plates on the opposite sides thereof, showing the bolt applied in side elevation.

1 indicates the body or main portion of the bolt, 2 the reduced end extension thereof, and 3 the head of the bolt. The body portion of the bolt is provided, preferably, with a left-hand screw (indicated at 4) and the reduced end extension 2 with a right-hand screw (indicated at 5) for a purpose which will appear.

6 indicates a nut screw-threaded to engage the larger or body portion of the bolt, and 7 indicates a spiral spring interposed between the nut 6 and the head of the bolt and surrounding the body portion of said bolt, as shown.

8 and 9 indicate the fish-plates, the fish-plate 8, adjacent to the nut 9, having perforations to permit the passage through them of not only the reduced end of the bolt, but of the enlarged or body portion thereof, while the perforations in the fish-plate 9 are screw-threaded to receive the reduced and threaded extensions on the ends of the bolts.

The body portions 1 of the bolts pass freely through the perforations in the rail 10.

By the construction described it will be seen that the bolts are passed through the fish-plate 8 and rail 10 and turned to engage the fish-plate 9, drawing the latter snugly into contact with the rail 10, after which the nuts are adjusted upon the body portion over the left-hand screw-threads thereon for causing the fish-plates to snugly clamp the rail ends between them. The spring 7 presses snugly against the face of the nut and serves to prevent any backing of the same, thereby holding both the bolts and the fish-plates securely in place.

Having thus described the invention, what I claim as new, and desire to secure by Letters Patent, is—

1. A bolt provided with a reduced end extension with a screw-thread thereon for engaging one fish-plate, the larger or body portion of the bolt being provided with a reverse screw-thread, in combination with a nut thereon for engaging the opposing fish-plate, substantially as described.

2. The bolt for clamping the fish-plate to the interposed rail, the body portion of the bolt being screw-threaded to receive a nut for clamping the adjacent fish-plate, said bolt having a reduced and reversely-threaded extension for engaging the opposing fish-plate, in combination with a nut adjustable on said body portion, and a spiral spring surrounding the bolt intermediate said nut and the bolt-head, substantially as and for the purpose described.

In testimony whereof I have signed this specification in the presence of two subscribing witnesses.

HOWELL EVANS.

Witnesses:
LOUIS AUER,
JOHN KIKEL.